United States Patent Office 2,809,956
Patented Oct. 15, 1957

2,809,956

POLYMERIC ORGANO-TIN MERCAPTO COMPOUNDS, METHOD OF MAKING SAME, AND HALOGEN - CONTAINING RESINS STABILIZED THEREWITH

Gerry P. Mack, Jackson Heights, and Emery Parker, New York, N. Y., assignors, by mesne assignments, to Carlisle Chemical Works, Inc., Reading, Ohio, a corporation of Ohio No Drawing. Application October 5, 1953, Serial No. 384,352

9 Claims. (Cl. 260—45.75)

The invention relates to new polymeric organo-tin compounds and to halogen-containing resins stabilized therewith.

This application is a continuation-in-part of our co-pending patent application, Serial No. 329,481, filed January 2, 1953, in which we have described compounds of the formulae (1) 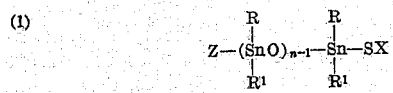

and (2) 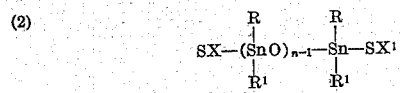

In these formulae, R and R¹ are monovalent hydrocarbon radicals. They may be different but will be in most cases identical when the dihydrocarbon tin halides or oxides available in commerce are used as starting materials for the synthesis of the compounds; R and R¹ may be aliphatic, aromatic, or alicyclic groups, such as methyl, ethyl, propyl, butyl, amyl, hexyl, octyl, lauryl, allyl, benzyl, phenyl, tolyl, cyclohexyl.

SX and SX¹ are radicals of a mercapto compound, which are bound through the S atom to a terminal Sn atom. Suitable mercapto compounds are, for instance, mercaptans, mercapto alcohols and esters thereof, and esters of mercapto acids.

We prefer to use aliphatic mercaptans having 8 to 18 C atoms, such as decyl or lauryl mercaptan, because of the offensive smell of the lower mercaptans. As aromatic mercaptans, thionaphthol, thiobenzyl alcohol, phenoxyethyl mercaptan, phenoxyethoxyethyl mercaptan, and others, may be employed.

As examples for suitable mercapto-alcohols, we may recite monothioethylene glycol, monothiopropylene glycol, thioglycerol, thiodiethylene glycol, and others. Particularly suitable are the esters of those mercapto alcohols in which the hydroxyl groups are esterified by an aliphatic, aromatic, or alicyclic saturated or unsaturated monocarboxylic acid.

Readily available mercapto acid esters are the esters of mono or dibasic aliphatic and aromatic mercapto acids, such as esters of thioglycolic acid, beta thiopropionic acid, thiolactic acid, thiobutyric acid, alpha mercaptolauric acid, thiomalic acid, thiosalicylic acid, and the like.

The group Z may be:

(a) The residue of an alcohol or of a carboxylic acid linked through the oxygen of the alcoholic hydroxyl group or of the carboxylic group to a terminal tin atom. An illustrative list of alcohols and acid which are suitable for attachment to said tin atoms has been recited in the copending patent application, Serial No. 313,806, for Stannanediol Derivatives, filed October 8, 1952, by Gerry P. Mack and Ferdinand B. Savarese, now Patent No. 2,684,973.

(b) An organic radical having a carbon atom of a methylene group adjacent to at least two negative groups and linked through said carbon atom to Sn. Such radicals are disclosed in our Patent No. 2,604,483.

(c) The radical of a sulfonamide, imide, or oxime, linked to the Sn atom through their N atoms.

$n$ in the above formula is a numeral higher than 1 designating the degree of polymerization. As, for the practical application of the compounds it is not necessary to use well-defined polymers, $n$ will be in general a fractional value not higher than 12, preferably between 1.1 and 4.

In general, the polymers are liquids, semisolid or wax-like compounds; the liquids become more viscous and less volatile with increasing polymerization. Compounds of the Formula 2 may be prepared by reacting a polymeric organo-tin dialkoxide, as disclosed in our Patent No. 2,626,953, with two moles of the same mercapto compound or with one mole each of different mercapto compounds. They may be designated as the di-mercaptides of linear hydrocarbon substituted polystannane diols.

Compounds of the Formula 1 may be similarly prepared by reacting a polymeric organo-tin dialkoxide or a linear hydrocarbon substituted polystannanediol monoester or ether ester with one mole of a mercapto compound. Another method consists in reacting a polymeric organo-tin dialkoxide with one mole of a mercapto compound and one mole of a sulfonamide, imide, oxime, sulfone, or a compound having an activated methylene group of the type disclosed in our Patent No. 2,604,483.

The reactions may be carried out in the absence of any solvent. However, we prefer to use a solvent in order to dilute the ingredients and to prevent the overheating of the batch during the reaction. A solvent must be used which does not interfere with the reaction; suitable inert solvents are aliphatic and aromatic hydrocarbons, ethers and similar conventional organic solvents.

Example 1

81.6 g. of 2-ethylhexyl thioglycolate (.4 mole) were slowly added at a temperature of 40 to 50° C. to a solution of 110 g. of a dimeric dibutyl tin dimethoxide in warm toluene. After the addition was completed, a rise in the temperature was observed. The slightly hazy solution was filtered, and the toluene and split-off methanol were distilled off at a temperature of 80 to 90° C., under reduced pressure at 5 mm. Dimeric dibutyl tin di(2-ethylhexyl aceto mercaptide) was obtained as a clear liquid in a yield of 95.1%.

Similarly, the trimer and tetramer were obtained by using the trimeric and tetrameric dibutyl tin dimethoxide, respectively, as starting material. These starting materials were prepared as described in our Patent No. 2,626,953.

The properties of the obtained polymeric compounds, in comparison with the monomer, are given in the following table.

| Compound | M. wt. | Sn, percent | | Sp. gr. at 20° C. | Ref. Ind. at 20° C. | Viscosity, cp. at 25° C. | Volatility at 330° F., percent |
|---|---|---|---|---|---|---|---|
| | | Theory | Found | | | | |
| RS—Sn—SR with R¹ above and below | 639.5 | 18.56 | 18.61 | 1.131 | 1.5073 | 14 | 5.85 |
| RS—Sn—O—Sn—SR with R¹ | 888.4 | 26.72 | 27.3 | 1.245 | 1.5128 | 370 | 3.89 |
| RS—(Sn—O)₂—Sn—SR with R¹ | 1,137.3 | 31.32 | 31.4 | 1.286 | 1.5166 | 3,000 | 2.30 |
| RS—(Sn—O)₃—Sn—SR with R¹ | 1,386.2 | 32.17 | 32.0 | 1.330 | 1.5220 | 15,000 | 1.93 |

In the formulae, R stands for the group $$C_4H_9CH(C_2H_5)CH_2OOCCH_2$$

and $R^1$ for butyl.

The $n$ in the formulae are approximate values; actually, they differed from the integer by about 5 to 10 percent.

Similar results were obtained with other diorgano-tin dialkoxides and other esters of thioglycolic acid, for instance the ester obtained from oleyl alcohol and thioglycolic acid.

*Example 2*

80 g. of a polymeric dibutyl tin dimethoxide corresponding essentially to the trimer (0.1 mole) were dissolved in warm toluene and reacted with 20.4 g. of 2-ethylhexyl thioglycolate (0.1 mole) and subsequently with 20 g. of lauric acid (0.1 mole). After a small amount of unreacted matter had been removed, the toluene and methanol were removed by vacuum distillation. The resulting compound of the formula $$C_4H_9CH(C_2H_5)CH_2OOCCH_2S-(SnO)_3-OCC_{11}H_{23}$$
with $C_4H_9$ substituents was obtained in a yield of 90 percent.
Tin content: Found 31.4%; theory 31.57%.
Viscosity at 25° C.: 2,000 cps.
Sp. gr. at 20° C.: 1.256.
Ref. Ind. at 20° C.: 1.5069.

*Example 3*

55 g. of an essentially dimeric dibutyl tin dimethoxide (0.1 mole) was reacted in toluene with 20.4 g. of 2-ethylhexyl thioglycolate (0.1 mole) and subsequently with 37.5 g. of oleyl maleate halfester (0.1 mole). A small amount of impurity was removed by filtration, and then the methanol formed in the reaction together with the toluene was distilled off in vacuo. The obtained compound corresponded essentially to the formula $$C_4H_9CH(C_2H_5)CH_2OOCCH_2S-\underset{C_4H_9}{\overset{C_4H_9}{Sn}}-O-\underset{C_4H_9}{\overset{C_4H_9}{Sn}}-OOCCH$$
$$C_{18}H_{35}OOCCH$$

Tin content: Found 22.3%; theory 21.3%.
Sp. gr. at 25° C.: 1.164.
Ref. Ind. at 20° C.: 1.5037.

*Example 4*

In an identical manner as in the preceding example, but using a dibutyl tin dimethoxide corresponding essentially to a trimer, 2-ethylhexyl thioglycolate and propyleneglycol maleate half-ester, a semisolid compound was obtained in 92% yield having essentially the formula $$C_4H_9CH(C_2H_5)CH_2OOCCH_2S-(\underset{C_4H_9}{\overset{C_4H_9}{Sn}}-O)_2-\underset{C_4H_9}{\overset{C_4H_9}{Sn}}-OOCCH$$
$$CH_3CHOHCH_2OOCCH$$

Tin content: Found 32.1%; theory 31.44%.

*Example 5*

1 mole of an essentially tetrameric dibutyl-tin dimethoxide were reacted in toluene with 2 moles of dodecyl mercaptan. After removal of the impurities, the toluene and methanol were distilled off at reduced pressure and a waxlike solid product was obtained, which had an indefinite melting point and corresponded essentially to the formula $$C_{12}H_{25}S-(\underset{C_4H_9}{\overset{C_4H_9}{Sn}}-O)_3-\underset{C_4H_9}{\overset{C_4H_9}{Sn}}-SH_{25}C_{12}$$

Tin content: Found 36.3%; theory 34.67%.

*Example 6*

86.2 g. of an essentially dimeric diethyl tin dimethoxide were dissolved in 200 cc. of toluol and 81.6 g. of isooctyl thioglycolate were added to the solution. After removing the solvent and the methanol at 100° C. at 5 mm. vacuum, a liquid product was obtained, which essentially corresponded to the formula $$C_8H_{17}OOCCH_2S-\underset{C_2H_5}{\overset{C_2H_5}{Sn}}-O-\underset{C_2H_5}{\overset{C_2H_5}{Sn}}-SCH_2COOC_8H_{17}$$

Tin content: Found 30.9%; theory 30.6%.

The new polymeric organo-tin mercapto-compounds are useful as stabilizers for halogen-containing resins and have the particular advantage that they combine the advantages of organo-tin mercapto compounds, as pointed out in our copending application, Ser. No. 329,481, filed January 2, 1953, with the advantages of the polystannanediol derivatives as recited in our Patent No. 2,592,926, i. e. low volatility. In addition, the new compounds present an excellent balance of the two active ingredients, the organo-tin group and the mercapto group. Because of their high tin content, smaller dosages can be used than with monomers, which reduces the risk of developing volatile, ill-smelling decomposition products during compounding and on exposure to high temperatures. At the same time, the amount of plasticizer to be incorporated in the resin may be reduced.

As stabilizers, we use the polymeric organo-tin mercapto compounds in amounts of 0.1 to 10 percent, preferably 0.5 to 5 percent, by weight of the organo-tin compound on the weight of the halogen-containing compound. They may be used alone or in mixture with other non-metallic or metallic stabilizers, such as salts of barium, strontium, calcium, zinc, tin, and of other metals which do not form colored sulfides.

Among the non-metallic stabilizers, particularly compounds having one or more epoxy groups in the molecule are of great value in combination with the polymeric organo-tin mercapto compounds. But also compounds having generally recognized anti-oxidant properties such as substituted phenols, triesters of phosphorous acid, and the like, can be employed. The new stabilizers are compatible with most of the conventional plasticizers and are of particular utility in combination with such plasticizers which tend to reduce the stability of halogen-containing resins.

An illustrative list of halogen-containing resins, which are made heat and light resistant by the polymeric organo-tin mercapto compounds of this invention, includes polymers of vinyl chloride and vinyl resins containing vinyl chloride units in their structure, such as copolymers of vinyl chloride with vinyl esters of aliphatic acids, particularly vinyl acetate; copolymers of vinyl chloride with esters of acrylic and methacrylic acids, and with acrylonitrile; copolymers of vinyl chloride with diene compounds and unsaturated dicarboxylic acids or their anhydrides, such as copolymers of vinyl chloride with diethyl maleate, diethyl fumarate or maleic anhydride; after-chlorinated polymers and copolymers of vinyl chloride; copolymers of vinyl chloride and vinylidene chloride with unsaturated aldehydes, ketones and others, such as acrolein, croton aldehyde, vinyl methyl ketone, vinyl methyl ether, vinyl isobutyl ether, and the like; polymers of vinylidene chloride and copolymers of the same with vinyl chloride and other polymerizable compounds; polymers of vinyl chloroacetate and dichlordivinyl ether; chlorinated polymers of vinyl acetate; chlorinated polymeric esters of acrylic and alpha-substituted acrylic acids; polymers of chlorinated styrenes, for instance dichlorostyrene; chlorinated rubber; chlorinated polymers of ethylene; polymers and after-chlorinated polymers of chlorobutadienes, and their copolymers with vinyl chloride; rubber hydrochloride and chlorinated rubber hydrochloride; and mixtures of the polymers recited herein with each other or other polymerizable compounds. The corresponding bromides and fluorides are equally well stabilized.

The following examples illustrate the use of the compounds as stabilizers. It is to be understood that a stabilizer employed in one example for a particular resin may be used for other resins, and vice versa. It is further to be noted that we have used such compounds as stabilizers which can be prepared from starting materials readily available in commerce, such as dibutyl tin compounds, lauryl mercapto compounds, thioglycolic acid and its esters. However, it should be understood that these convenient starting materials can be replaced by other compounds, as recited above, without substantially modifying the obtained results.

*Example 7*

1 g. of the trimeric dibutyl tin di(2-ethylhexyl aceto mercaptide) obtained according to Example 1 was added to 100 g. of a vinyl chloride resin together with 40 g. of dioctyl phthalate. The mix was thoroughly blended and then milled on a 2-roll mill at 350° F. for 10 min. until a uniformly fluxed sheet was obtained. From the sheet, films of 6" x 6" and 40 mil thickness were pressed out under 10,000 p. s. i. The obtained film was optically clear and colorless. 2 x 2 square inch pieces of this film were then heated in an air circulating oven for up to 2 hours at 350° F., and the change in color was compared with the original film without stabilizer. Slight discoloration was noticed after two hours. No objectionable fuming was noticed during all these operations, and the films themselves had only the odor resulting from the plasticizer.

From the same stock, a thin 10 mil film was sheeted out and exposed in an Atlas fadeometer. The first sign of decomposition in form of small brown dots was noticed only after 400 hours' exposure at 95° F.

If an identical film was prepared using the same amount of stabilizer but in the form of the monomeric dibutyl tin di(2-ethylhexyl aceto mercaptide), the heat stability of the film was about the same as that of the film stabilized with the trimer; however, already during milling, and particularly during the heating in the air circulating oven, very objectionable fuming took place and the films gave off a rather strong unpleasant smell resembling that of thioglycolic acid. The light fastness of these films was lower and decomposition was noticeable already after exposure of 250 hours. Another disadvantage was that these films were much more sensitive to cross-staining than the films stabilized with the trimer when brought in contact with films containing lead or cadmium type stabilizers.

*Example 8*

1 g. of the compound obtained according to Example 4 was dissolved in 70 g. of dioctyl phthalate and blended with 100 g. of a dispersion type vinyl chloride resin to a uniform paste. From this paste, films were cast on copper plates and fused at 350° F. for 5, 15, 30 and 45 min. No discoloration could be observed up to 30 minutes; the film fused for 45 min. was yellowish. It is of particular interest that no black discoloration due to the formation of copper sulfide occurred in any of these films.

*Example 9*

A polymeric dibutyl tin dimethoxide was prepared according to Example 1 of Patent No. 2,623,953 (our copending patent application, Serial No. 29,935, filed May 28, 1948). This dibutyl tin dimethoxide was a mixture of polymer and monomer having an average degree of polymerization of about 1.25, as determined from the tin and methoxy content. 300 g. of this polymer were mixed with 162 g. of lauryl mercaptan and the mixture was heated at 100–110° C. until 25.6 g. of methanol had distilled out. The batch was then further heated at 110–120° C. for two hours while leading moist nitrogen through the product and condensing the escaping gases which contained methanol and water. After a small amount of impurity was filtered off, a clear, almost colorless compound was obtained having a tin content of 27.8% and corresponding substantially to the formula:

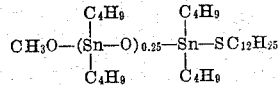

Two grams of this compound were added to 100 g. of vinyl chloride resin and the mixture milled on a 2-roll mill at 340° F. for 10 minutes. Then the plastic mass was sheeted out and press-polished between chrome-plated steel plates for 15, 30, 45, 60 and 90 minutes at 320° F. and 10,000 p. s. i. pressure to sheets of 0.040 inch thickness. All sheets remained colorless and glass clear even after 90 minutes of heat-pressing.

The foregoing illustrates the practice of this invention, which, however, is not to be limited thereby but is to be construed as broadly as permissible and limited solely by the appended claims.

We claim:

1. As a new group of organo-tin compounds, mercapto derivatives of a hydrocarbon substituted linear polystannanediol of the formula:

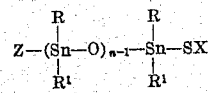

wherein R and R¹ are monovalent hydrocarbon radicals, SX is the radical of a mercapto compound selected from the group consisting of aliphatic mercaptans having from 8 to 18 C atoms, aromatic mercaptans, monohydric and polyhydric thioalcohols and thioalcoholesters, and thiocacid esters said radical being linked to the Sn atom through the S atom of the mercapto group, Z is a member of the group consisting of SX, alkoxy, monocarboxylic acid radicals, and polycarboxylic acid radicals having not more than three carboxylic groups, of which all but one are blocked by esterification, and wherein $n$ designates a numeral higher than 1.

2. A method of preparing hydrocarbon substituted linear polystannanediol mercaptides comprising heating a linear hydrocarbon substituted polystannanediol ether of a lower aliphatic alcohol with a mercapto compound selected from the group consisting of aliphatic mercaptans having from 8 to 18 C atoms, aromatic mercaptans, monohydric and polyhydric thioalcohols and thioalcohol esters, and thioacid esters, at a temperature of about 40 to 120° C., and distilling off the lower aliphatic alcohol formed during the reaction.

3. A method as defined in claim 2 wherein the linear hydrocarbon substituted polystannanediol ether is a polymeric dialkyl tin dialkoxide of an alcohol having not more than 5 C atoms.

4. A method as defined in claim 2 wherein the linear hydrocarbon substituted polystannanediol ether is a polymeric dibutyl tin dimethoxide.

5. A method of preparing hydrocarbon substituted linear polystannanediol dimercaptides comprising heating one mole of a linear hydrocarbon substituted polystannanediol ether of a lower aliphatic alcohol with about two moles of a mercapto compound selected from the group consisting of aliphatic mercaptans having from 8 to 18 C atoms, aromatic mercaptans, monohydric and polyhydric thioalcohols and thioalcohol esters, and thioacid esters, at a temperature of about 40 to 120° C., and distilling off the lower aliphatic alcohol formed during the reaction.

6. A method of preparing hydrocarbon substituted linear mixed polystannanediol dimercaptides comprising heating one mole of a linear hydrocarbon substituted polystannanediol dialkoxide of a lower aliphatic alcohol with about one mole each of two different mercapto compounds selected from the group consisting of aliphatic mercaptans having from 8 to 18 C atoms, aromatic mercaptans, monohydric and polyhydric thioalcohols and thioalcohol esters, and thioacid esters, at a temperature of about 40 to 120° C., and distilling off the lower aliphatic alcohol formed during the reaction.

7. A method of preparing a hydrocarbon substituted linear polystannanediol mono ester mono mercapto compound comprising heating one mole of a linear hydrocarbon substituted polystannanediol dialkoxide of a lower aliphatic alcohol at a temperature of about 40 to 120° C. with about one mole of a mercapto compound selected from the group consisting of aliphatic mercaptans having from 8 to 18 C atoms, aromatic mercaptans, monohydric and polyhydric thioalcohols and thioalcohol esters, and thioacid esters, and about one mole of a member of the group consisting of monocarboxylic acids and polycarboxylic acids having not more than three carboxylic acid groups of which all but one are blocked by esterification.

8. A heat and light resistant plastic composition including as a major constituent a halogen-containing resin and as a stabilizer a mercapto derivative of a hydrocarbon substituted linear polystannanediol of the formula:

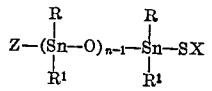

wherein R and R¹ are monovalent hydrocarbon radicals, SX is the radical of a mercapto compound selected from the group consisting of aliphatic mercaptans, having from 8 to 18 C atoms, aromatic mercaptans, monohydric and polyhydric thioalcohols and thioalcoholesters, and thioacid esters, said radical being linked to the Sn atom through the S atom of the mercapto group, Z is a member of the group consisting of SX, alkoxy, monocarboxylic acid radicals, and polycarboxylic acid radicals having not more than three carboxylic groups, of which all but one are blocked by esterification, and wherein $n$ designates a numeral higher than 1.

9. A heat and light resistant plastic composition as defined in claim 8 wherein the resin is a polymer containing a plurality of vinyl chloride units.

No references cited.